(12) United States Patent
Salo et al.

(10) Patent No.: US 7,246,359 B2
(45) Date of Patent: Jul. 17, 2007

(54) METHODS, SYSTEMS AND COMPUTER PROGRAM PRODUCTS FOR MAINTAINING ASSOCIATION INTEGRITY OF ENTERPRISE JAVABEANS (EJB) DURING EJB PASSIVATION AND REACTIVATION

(75) Inventors: Timo J. Salo, Cary, NC (US); Kevin J. Williams, Colorado Springs, CO (US)

(73) Assignee: International Business Machines Corporation, Armonk, NY (US)

( * ) Notice: Subject to any disclaimer, the term of this patent is extended or adjusted under 35 U.S.C. 154(b) by 562 days.

(21) Appl. No.: 10/632,157

(22) Filed: Jul. 31, 2003

(65) Prior Publication Data

US 2005/0028169 A1    Feb. 3, 2005

(51) Int. Cl.
G06F 9/54    (2006.01)
G06F 9/46    (2006.01)
G06F 9/44    (2006.01)
G06F 17/30   (2006.01)

(52) U.S. Cl. .................. 719/316; 719/313; 719/315; 707/103 X; 707/103 Y; 707/103 Z

(58) Field of Classification Search ............ 719/313, 719/315, 316; 707/103 R, 103 Y, 103 X, 707/103 Z
See application file for complete search history.

(56) References Cited

U.S. PATENT DOCUMENTS

| 6,269,373 | B1 | 7/2001 | Apte et al. |
| 6,298,478 | B1 | 10/2001 | Nally et al. |
| 6,877,111 | B2* | 4/2005 | Sharma et al. ................. 714/13 |
| 6,886,041 | B2* | 4/2005 | Messinger et al. .......... 709/226 |
| 2003/0120628 | A1 | 6/2003 | Salo et al. |
| 2004/0078782 | A1* | 4/2004 | Clement et al. ............. 717/116 |

OTHER PUBLICATIONS

"The WebLogic Server EJB Container and Supported Services", http://e-docs.bea.com/wls/docs70/ejb/EJB_environment.html, BEA Systems Inc., p. 1-27, published Jun. 25, 2002.*

"The WebLogic Server EJB Container and Supported Services", http://e-docs.bea.com/wls/docs70/ejb/EJB_environment.html, p. 1-27, published Jun. 25, 2002.*

(Continued)

Primary Examiner—Meng-Al T. An
Assistant Examiner—Richard Pantoliano, Jr.
(74) Attorney, Agent, or Firm—A. Bruce Clay; Myers Bigel Sibley & Sajovec

(57) ABSTRACT

A collection of target Enterprise JavaBeans (EJBs) that are associated with the source EJB in a one-to-many association is obtained in response to traversing the one-to-many association of the source EJB. The collection of target EJBs is registered in a collection registry. The source EJB is passivated without passivating the collection of target EJBs, and the source EJB is later reactivated. The collection of target EJBs that are associated with the source EJB that is reactivated is fetched from the collection registry in response to traversing the one to many association of the source EJB that is reactivated. The one-to-many association between the source EJB and the collection of target EJBs may be managed by a link object that is generated by a link factory.

12 Claims, 7 Drawing Sheets

OTHER PUBLICATIONS

Enterprise JavaBeans™ Specification Version 2.0, Sun Microsystems Inc., Aug. 22, 2001.*

Sun Microsystems, Inc., *Enterprise JavaBeans 2.0, Final Release*, Chapters 10, 12 and 14, Aug. 14, 2001, pp. 1-23, 125-215, 243-288, 293-310.

Holland, *Entity bean relationships in EJB 1.1*, Java Report, Apr. 2001, pp. 72, 66-70.

BEA, *The WebLogic Server EJB Container and Supported Services*, http://e- http://e-docs.bea.com/wls/docs70/ejb/EJB_environment. html, 26 pp., undated.

* cited by examiner

METHODS, SYSTEMS AND COMPUTER PROGRAM PRODUCTS FOR MAINTAINING ASSOCIATION INTEGRITY OF ENTERPRISE JAVABEANS (EJB) DURING EJB PASSIVATION AND REACTIVATION

FIELD OF THE INVENTION

This invention relates to computer program products, methods and systems, and more particularly to computer program products, methods and systems that employ Enterprise JavaBean™ architecture.

BACKGROUND OF THE INVENTION

"JavaBeans" is a component architecture for use with the Java programming language. JavaBean is the Java term for a component, where a component is a reusable building block of application logic that a programmer can combine with other components to form an application program. Enterprise JavaBeans is a server component architecture which can extend the JavaBeans architecture to an enterprise, i.e., an organization that uses computers in a networking environment, typically on a very large scale.

A Java programmer can create a Java application program by assembling components that provide the desired functionality for the application. Enterprise JavaBeans are described in detail in the specification entitled *Enterprise JavaBeans 2.0, Final Release*, Aug. 14, 2001, published by Sun Microsystems, Inc., and available on the World Wide Web at java.sun.com. Accordingly, Enterprise JavaBeans need not be described further herein.

Since the Enterprise JavaBean architecture can support high workload, memory intensive applications, one mechanism that is used by EJB to spare memory resources in bean passivation. Passivating a bean involves suspending the execution of the bean and saving its state to secondary storage. Memory can then be reclaimed for execution of other beans. At some point, the passivated bean may be reactivated and allowed to continue processing. Passivation and activation are described, for example, in Chapters 10, 12 and 14 of the EJB 2.0 Specification and need not be described in detail herein.

The EJB 2.0 Specification also introduces support for association relationships between entity beans. There are two main categories of association relationships between entity beans: single-valued relationships and many-valued relationships. See, for example, Chapter 10, Section 10.3.7 of the EJB 2.0 Specification, Pages, 137–155. Association relationships for EJBs are well known to those having skill in the art and need not be described further herein.

SUMMARY OF THE INVENTION

Embodiments of the present invention provide methods, systems and/or computer program products for maintaining association integrity of Enterprise JavaBeans (EJBs) during EJB passivation and reactivation. According to some embodiments of the present invention, a collection of target EJBs that are associated with a source EJB in a one-to-many or many-to-many association is obtained in response to traversing the one-to-many or many-to-many association of the source EJB. The collection of target EJBs is registered in a collection registry. In some embodiments, the collection of target EJBs that are associated with a source EJB in a one-to-many or many-to-many association is registered in the collection registry in response to passivation of the source EJB.

In other embodiments, the source EJB is reactivated. The collection of target EJBs that are associated with the source EJB that is reactivated is fetched from the collection registry in response to traversing the one-to-many or many-to-many association of the source EJB that is reactivated.

In still other embodiments of the present invention, the source EJB is reactivated. The collection of target EJBs that are associated with the source EJB that is reactivated is fetched from the collection registry if the collection of target EJBs that are associated with the source EJB is registered in the collection registry. Alternatively, the collection of target EJBs that are associated with the source EJB that is reactivated is materialized from secondary storage if the collection of target EJBs that are associated with the source EJB is not registered in the collection registry.

In other embodiments of the present invention, the one-to-many or many-to-many association between the source EJB and the collection of target EJBs is managed by a link object that is generated by a link factory. In these embodiments, registering the collection of target EJBs in a collection registry may be performed by creating a collection registry for the one-to-many or the many-to-many association by the link factory, in response to traversing the one-to-many or many-to-many association of the source EJB and creating a link object by the link factory to manage an instance of the one-to-many or many-to-many association. In other embodiments, the collection of target EJBs is fetched from the collection registry by checking the collection registry by the link object in response to the one-to-many or many-to-many association of the source EJB not being materialized, returning the collection of EJBs if the link object finds the collection of EJBs in the collection registry, and materializing the target collection if the target collection is not contained in the collection registry.

It will be understood that embodiments of the present invention have been described above primarily with respect to methods of maintaining association integrity of EJBs during EJB passivation and reactivation. However, related systems and/or computer program products also may be provided.

DETAILED DESCRIPTION

Figure 1:
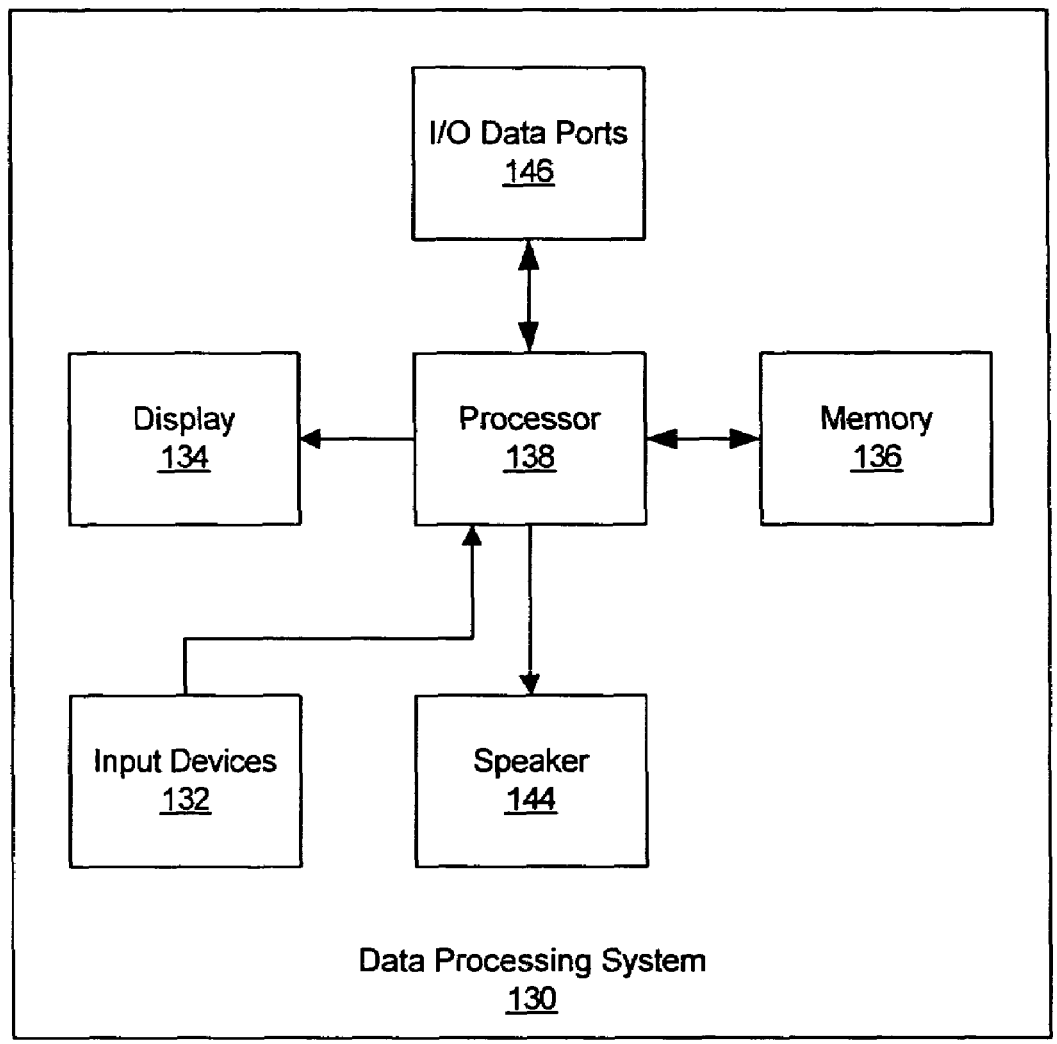
FIG. 1 is a block diagram of a data processing system that can maintain association integrity of EJBs during EJB passivation and reactivation according to some embodiments of the present invention.

The present invention now will be described more fully hereinafter with reference to the accompanying drawings, in which illustrative embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system and/or computer program product. Accordingly, the present invention may take the form of an entirely hardware embodiment, an entirely software embodiment or an embodiment combining software and hardware aspects, all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Various embodiments of the present invention will now be described with reference to the figures. Embodiments of the present invention may be incorporated into systems that use EJB architecture. FIG. 1 illustrates an exemplary embodiment of a data processing system 130 that can maintain association integrity of EJBs in accordance with some embodiments of the present invention. Such a data processing system 130 may, for example, be provided by one or more enterprise computer systems and may also include one or more application, personal, pervasive and/or embedded systems. The data processing system 130 of FIG. 1 is, thus, illustrative of data processing systems which may use EJBs, however, embodiments of the present invention may be provided by any type of data processing system capable of carrying out the operations described herein.

The data processing system 130 may include input device(s) 132 such as a keyboard or keypad, a display 134, and a memory 136 that communicate with a processor 138. The data processing system 130 may further include a speaker 144, and an I/O data port(s) 146 that also communicate with the processor 138. The I/O data ports 146 can be used to transfer information between the data processing system 130 and another computer system or a network. These components may be conventional components, such as those used in many conventional data processing systems, which may be configured to operate as described herein.

Figure 2:
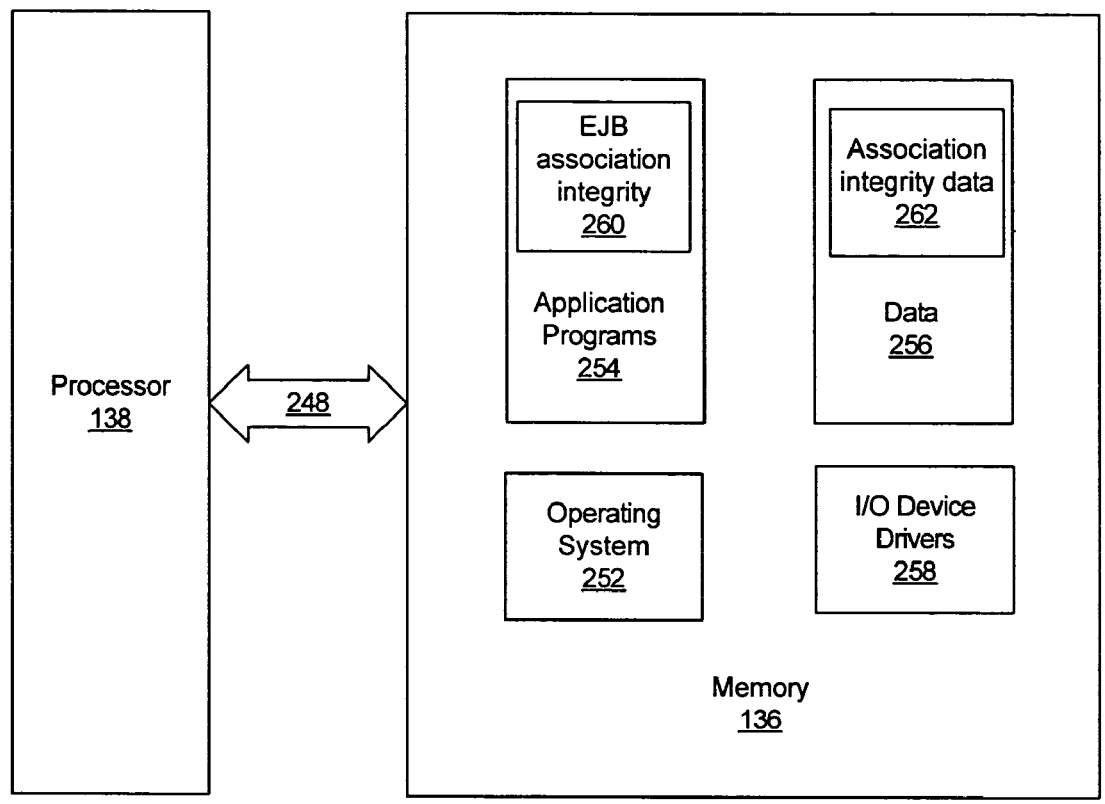
FIG. 2 is a more detailed block diagram of a data processing system that can maintain association integrity of EJBs during EJB passivation and reactivation according to some embodiments of the present invention.

FIG. 2 is a block diagram of data processing systems according to other embodiments of the present invention. The processor 138 communicates with the memory 136 via an address/data bus 248. The processor 138 can be any commercially available or custom enterprise processor which can use the EJB architecture. The memory 136 is representative of the overall hierarchy of memory devices containing the software and data used to implement the functionality of the data processing system 130. The memory 136 can include, but is not limited to, the following types of devices: cache, ROM, PROM, EPROM, EEPROM, flash memory, SRAM, and DRAM. Moreover, the memory and the processor may be integrated in whole or in part.

As shown in FIG. 2, the memory 136 may include several categories of software and data used in the data processing system 130: the operating system 252; the application programs 254; the input/output (I/O) device drivers 258; and the data 256. As will be appreciated by those of skill in the art, the operating system 252 may be any operating system suitable for use with a data processing system, such as OS/2, AIX or System390 from International Business Machines Corporation, Armonk, N.Y., Windows95, Windows98, Windows2000 or WindowsXP from Microsoft Corporation, Redmond, Wash., Unix or Linux. The I/O device drivers 258 typically include software routines accessed through the operating system 252 by the application programs 254 to communicate with devices such as the I/O data port(s) 146 and certain memory 136 components. The application programs 254 are illustrative of the programs that implement the various features of the data processing system 130 and may include at least one application which supports operations according to embodiments of the present invention. Finally, the data 256 represents the static and dynamic data used by the application programs 254, the operating system 252, the I/O device drivers 258, and other software programs that may reside in the memory 136.

Figure 4:
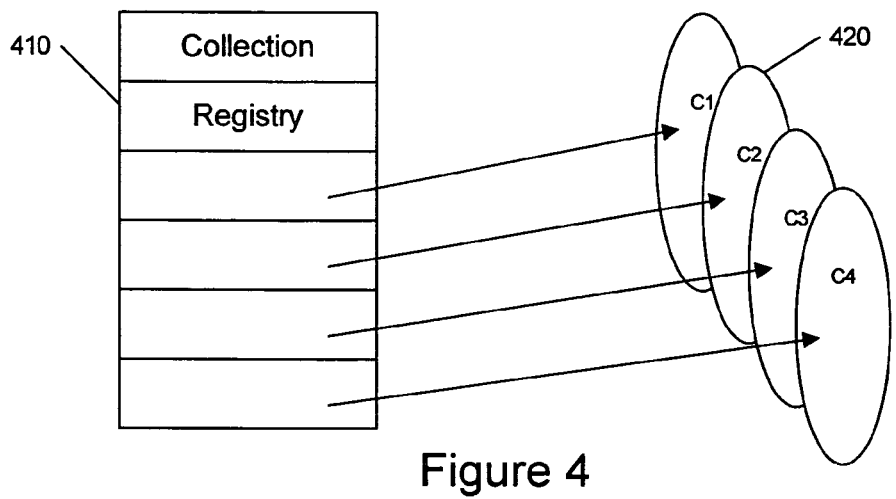
FIG. 4 is a block diagram of a collection registry and a collection of target EJBs according to some embodiments of the present invention.

As is further seen in FIG. 2, the application programs 254 may include an EJB association integrity module 260. The EJB association integrity module 260 may carry out the operations described herein for maintaining association integrity of EJBs during EJB passivation and reactivation. The data portion 256 of memory 136, as shown in the embodiments of FIG. 4, may, optionally, include association integrity data 262. The association integrity data 262 may be utilized by the EJB association integrity module 260 to maintain association integrity of EJBs during EJB passivation and reactivation.

While the present invention is illustrated, for example, with reference to the EJB association control module 260 being an application program in FIG. 2, as will be appreciated by those of skill in the art, other configurations may also be utilized while still benefitting from the teachings of the present invention. For example, the EJB association control module 260 may also be incorporated into the operating system 252, the I/O device drivers 258 and/or other such logical division of the data processing system 130. Thus, the present invention should not be construed as limited to the configuration of FIG. 2, but is intended to encompass any configuration capable of carrying out the operations described herein.

As was described above, the EJB 2.0 Specification introduces support for association relationships between entity beans. Unfortunately, these association relationships may significantly complicate the support of passivation. There are two main categories of association relationships between entity beans: single-valued relationships and many-valued relationships. Many-valued relationships can take one of two forms: one-to-many or many-to-many. Although some embodiments of the present invention are illustrated below using a one-to-many association relationship, embodiments of the present invention apply equally to both forms of many-valued relationships.

Figure 3:
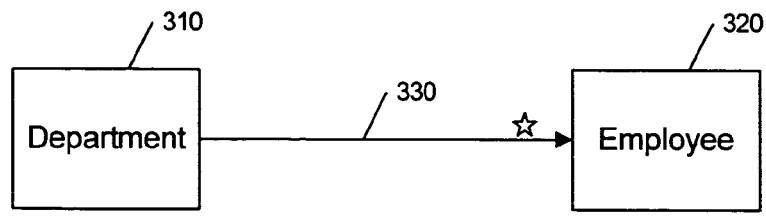
FIG. 3 is a block diagram illustrating two EJB entity beans with a one-to-many relationship between them.

FIG. 3 illustrates two EJB entity beans with a "one-to-many" relationship between them. In particular, a source EJB 310, such as a "Department" EJB, has a one-to-many relationship 330 with a collection of target EJBs 320, such as a collection of "Employee" EJBs. The association relationship 330 is named "Department has many Employees". When a client application traverses the relationship 330 from the source (Department) entity bean 310, for example by executing Department.getEmployees( ), it will be provided with a collection of associated Employee entity beans 320.

The EJB programming model allows client applications to directly hold onto and manipulate the collection or target EJBs 320 that is returned by the one-to-many association traversal 330. Thus, a client can maintain a reference to the collection of target EJBs 320 even when the source 310 has been passivated. After reactivation of the source 310, traversal of the relationship 330, for example via Department-.getEmployees( ), may need to reattach the original collection of target EJBs 320 which is still referenced by the client application or the integrity of the relationship may be sacrificed. Embodiments of the present invention provide methods, systems and/or computer program products that can provide successful reattachment after reactivation of the source bean.

In particular, as shown in FIG. 4, some embodiments of the present invention can register collections of target EJBs, and in some embodiments all collections of target EJBs, such as collections 420, that are returned as a result of the traversal of a one-to-many relationship, such as the relationship 330 of FIG. 3. As shown in FIG. 4, a collection registry 410 may be provided. In some embodiments, the collection registry may be provided in the EJB association integrity module 260 and/or association integrity data 262 of FIG. 2. In some embodiments, whenever a source EJB is passivated, the collection of target EJBs, such as a collection 420 of FIG. 4 that contains the related beans, is registered in the collection registry 410. Accordingly, when a collection is later referenced by the traversal of a one-to-many or many-to-many relationship, it may be retrieved from the collection registry 410 if it is contained there. It will be understood that a single collection registry 410 may be used to serve all one-to-many or many-to-many relationships in some embodiments. In other embodiments, a separate collection registry 410 may be created for each defined one-to-many or many-to-many relationship role, to support scalability. In still other embodiments, a collection registry 410 may contain some, but not all, of the relationships.

Figure 5:
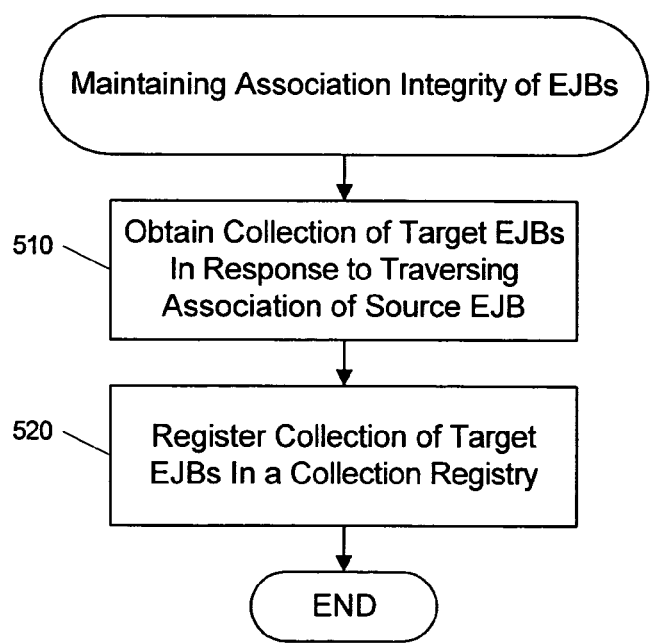
FIGS. 5–7 are flowcharts illustrating operations for maintaining association integrity of EJBs during EJB passivation and reactivation according to some embodiments of the present invention.

FIG. 5 is a flowchart illustrating operations for maintaining association integrity of EJBs during EJB passivation and reactivation according to some embodiments of the present invention. As shown in FIG. 5, at Block 510, a collection of target EJBs, such as EJBs 320 and/or 420, that are associated with a source EJB, such as EJB 310 in a one-to-many or many-to-many association, such as the association 330, is obtained, in response to traversing the one-to-many or many-to-many association 330 of the source EJB 310. Then, at Block 520, the collection 320 and/or 420 of target EJBs that are associated with a source EJB 310 is registered in a collection registry, such as the collection registry 410 of FIG. 4. In some embodiments, operations of Block 520 may be performed in response to passivation of the source EJB. In other embodiments, the operations of Block 520 may be performed whenever a collection of target EJBs is obtained at Block 510.

Figure 6:
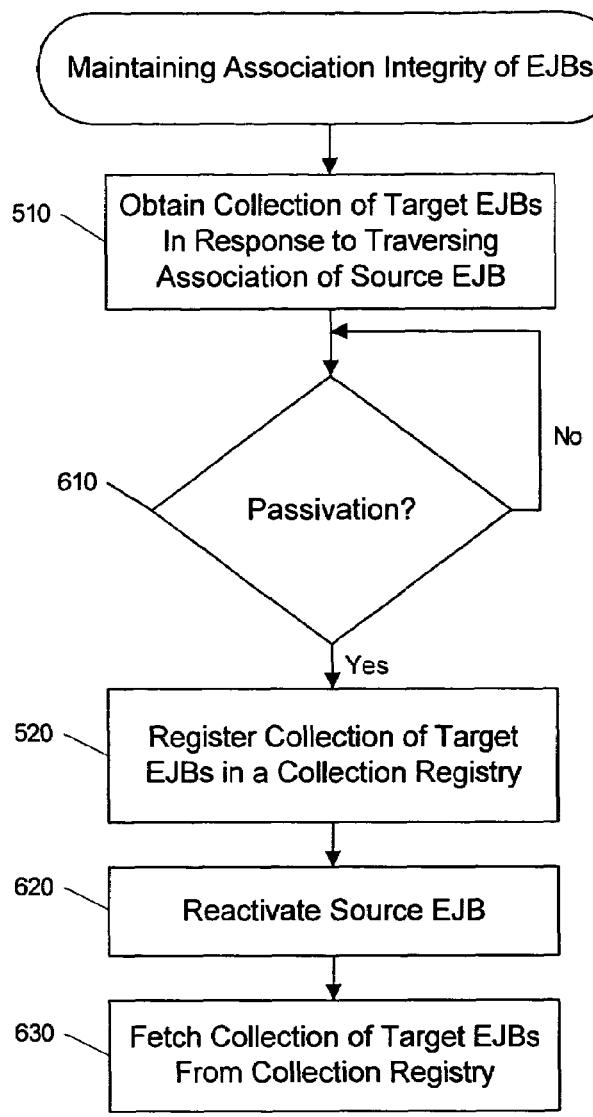

FIG. 6 is a flowchart of operations that may be performed for maintaining association integrity of EJBs during EJB passivation and reactivation according to other embodiments of the present invention. As shown in FIG. 6, the operations of Block 510 is performed. Then at Block 610, in response to passivation of the source EJB 310, the operations of Block 520 are performed. At Block 620, the source EJB 310 is reactivated. At Block 630, the collection of target EJBs 320 and/or 420 that are associated with the source EJB 310 that is reactivated is fetched from the collection registry 410 in response to traversing the one-to-many or many-to-many association of the source EJB that is reactivated.

Figure 7:
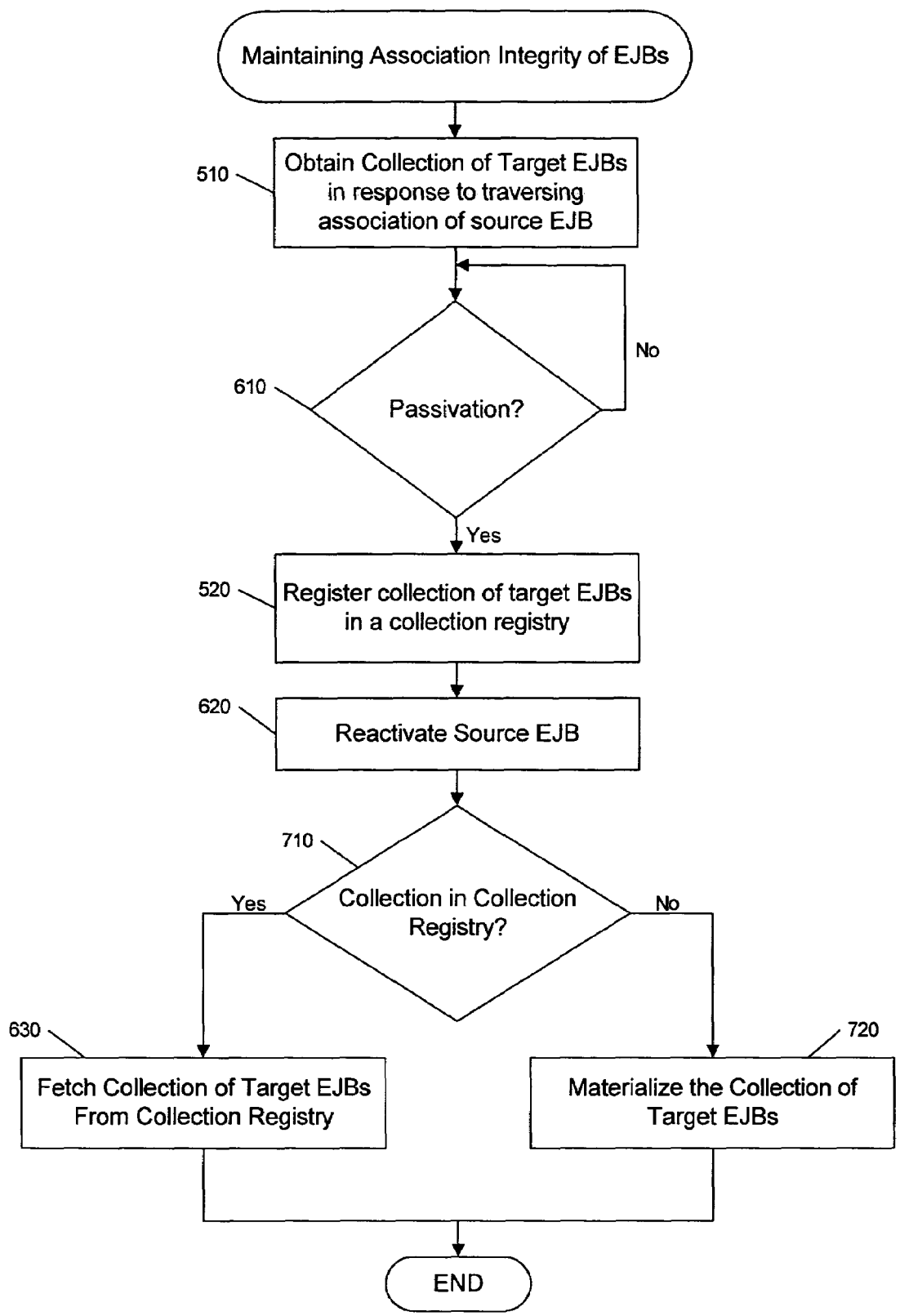

FIG. 7 is a flowchart of operations that may be performed to maintain association integrity of EJBs during EJB passivation and reactivation according to still other embodiments of the present invention. Referring now to FIG. 7, the operations of Blocks 510, 610, 520 and 620 are performed. Then, at Block 710, a determination is made as to whether the collection of target EJBs 320 and/or 420 that are associated with the source EJB 310 is registered in the collection registry 410. If yes, then operations of Block 630 are performed. If no, then the collection of target EJBs 320 and/or 420 that are associated with the source EJB 310 is materialized from secondary storage at Block 720.

Other embodiments of the present invention will now be described that use intelligent objects known as link objects or simply as "links", which are created by a link factory, to manage association relationships. The use of link objects to manage association relationships is described in copending application Ser. No. 10/026,387, filed Dec. 21, 2001, by the present inventors, entitled *Decentralized Many-to-Many Relationship Management in an Object Persistence Management System*, and published on Jun. 26, 2003 as Publication No. US 2003/0120628 A1, which is assigned to the assignee of the present application, the disclosure of which is hereby incorporated by reference herein in its entirety as if set forth fully herein.

Figure 8:
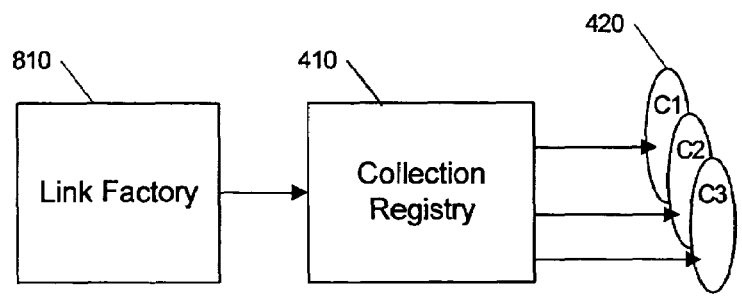
FIG. 8 is a block diagram illustrating the use of links to maintain association integrity of EJBs during EJB passivation and reactivation according to some embodiments of the present invention.
Figure 9:
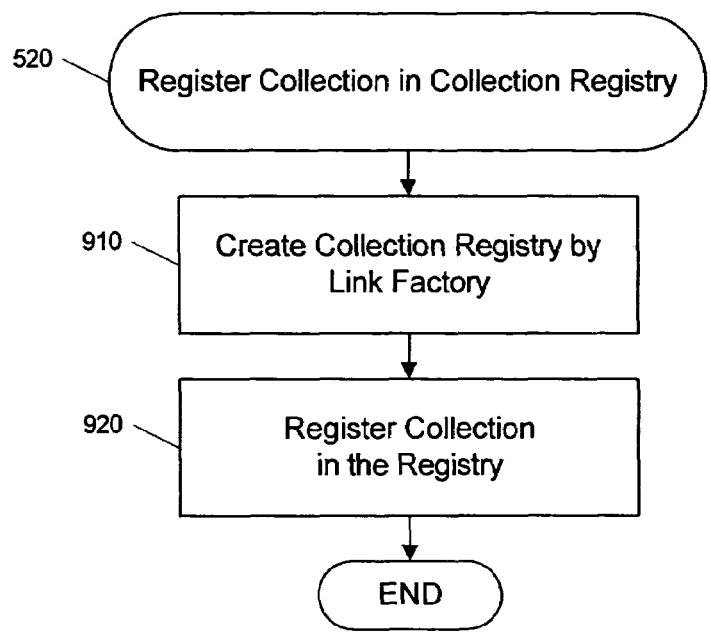
FIGS. 9–11 are flowcharts of operations that may performed to maintain association integrity of EJBs during EJB passivation and reactivation using links according to some embodiments of the present invention.
Figure 10:
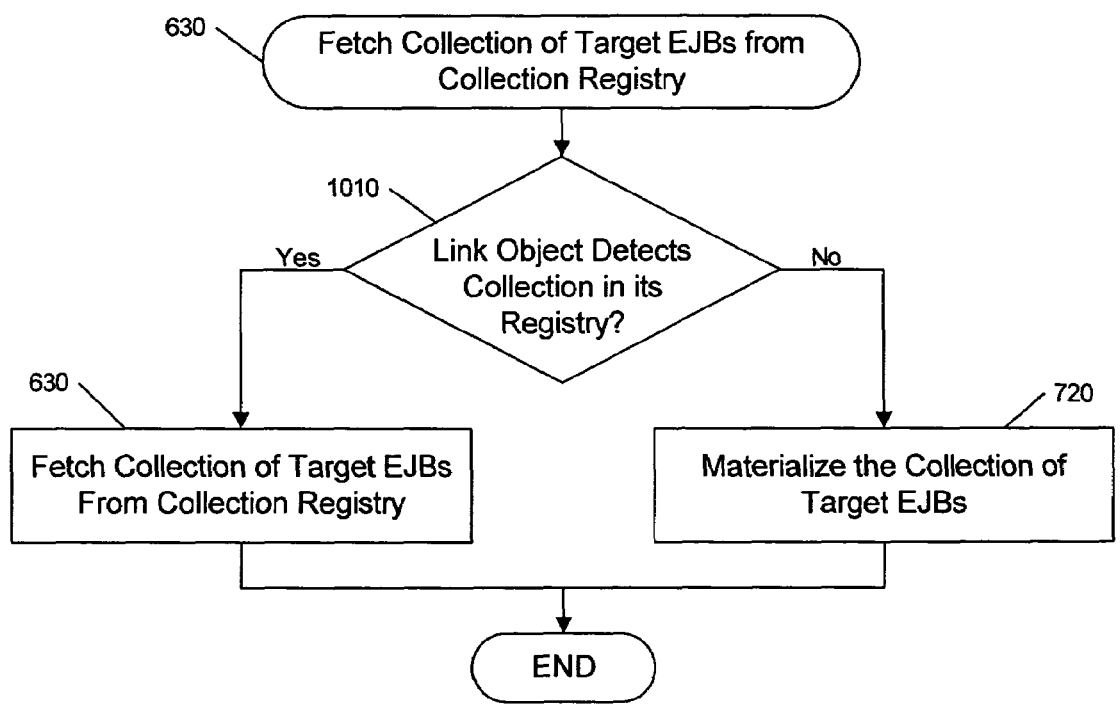

FIG. 8 is a block diagram illustrating the use of links to maintain association integrity of EJBs during EJB passivation and reactivation according to some embodiments of the present invention. FIGS. 9 and 10 are flowcharts of operations that may be performed to maintain association integrity of EJBs during EJB passivation and reactivation using links according to some embodiments of the present invention.

In general, when an association relationship is initially traversed, a link factory is employed to assign a link object to manage the relationship on behalf of the source EJB. It will be understood that what is meant by "initially traversed" is that there is no link object currently assigned to the source EJB to manage the relationship. This situation can occur for several reasons, including one in which the source EJB was passivated and now is reactivated.

Some embodiments of the present invention can provide a link factory for each defined one-to-many or many-to-many relationship role in the system. Each link factory can maintain a collection registry to reference the target collection of source EJBs while they are passivated. When the one-to-many or many-to-many relationship of a reactivated bean is traversed, the link for the relationship can check its registry and return the existing registered target collection if it is present. If the collection is not present in the registry, then the link can materialize the target collection from the database.

In particular, referring now to FIGS. 8 and 9, in order to register the collection of target EJBs 420 in the collection registry 410, which may correspond to Block 520 of FIGS. 5–7, a link factory 810 creates a collection registry 410 in response to traversing the one-to-many or many-to-many association of the source EJB, at Block 910. Then, at Block 920, the collection of target EJBs that is associated with the source EJB is registered in the collection registry 410, for example using a link object or link that is created by the link factory 810. Thus, when an association relationship is initially traversed, the link factory 810 is employed to assign a link object to manage a relationship on behalf of the source bean. It will be understood that what is meant by "initially traversed" is that there is no link object 820 currently assigned to the source bean to manage the relationship. This situation can occur for several reasons, including one in which the source bean has been passivated and is now reactivated.

FIG. 10 illustrates operations that may be performed to fetch the collection of target EJBs 420 from the collection registry 410 using a link factory 810 and link objects according to other embodiments of the present invention, which may correspond to Block 630 of FIGS. 6 and 7. As shown in FIG. 10, at Block 1010, a determination is made as to whether the link object detects the collection of target EJBs in its collection registry 410. In particular, each link factory 810 can maintain a collection registry to reference the target collection of source EJBs while they are passivated. When the one-to-many or many-to-many relationship of a reactivated EJB is traversed, the link for the relationship will check its registry at Block 1010. As shown at Block 630, the link object will return the existing registered target collection if it is contained in the collection registry 410. As shown at Block 720, if the collection is not present in the collection registry, then the link will materialize the target collection from the database.

Figure 11:
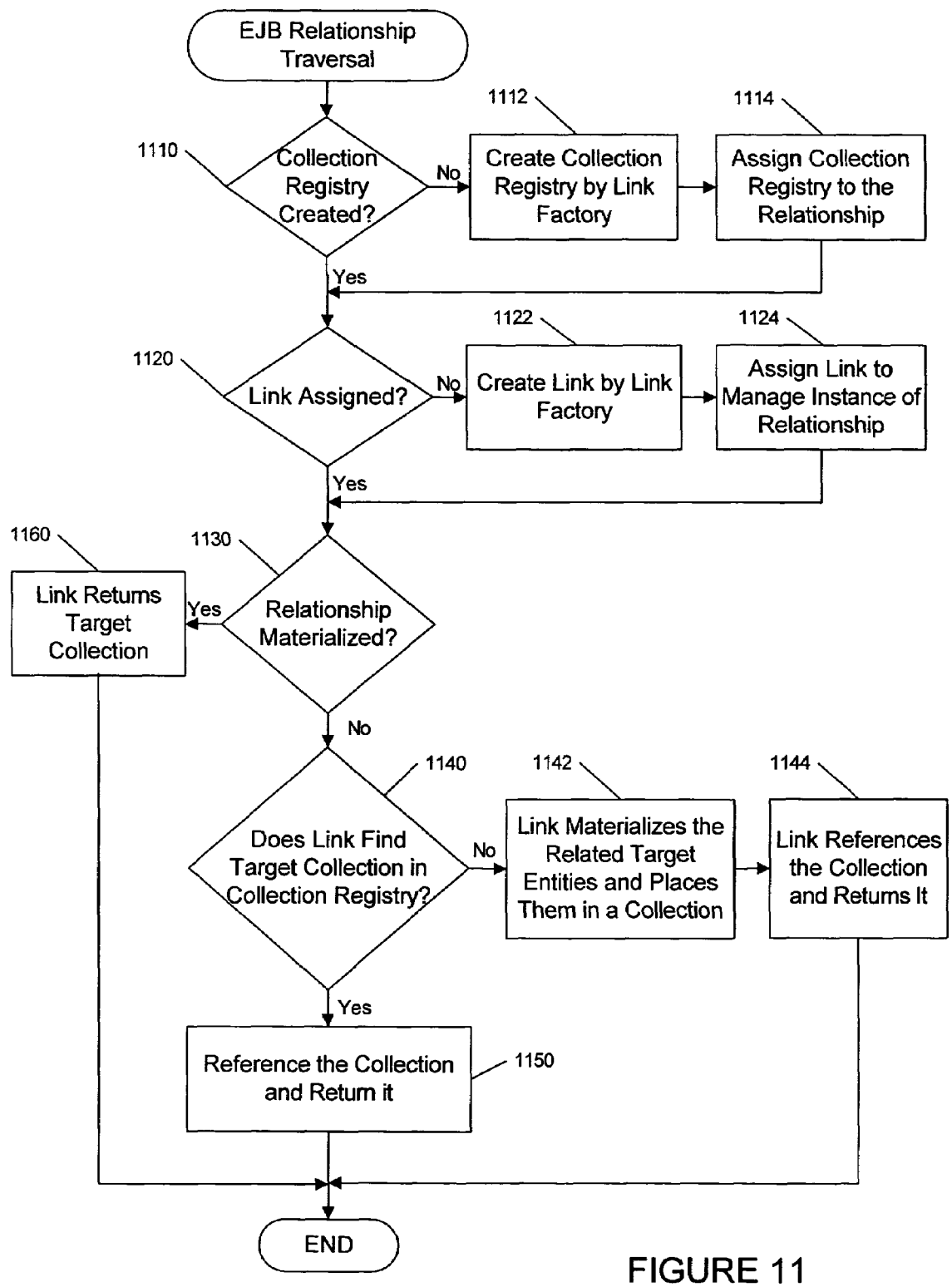

FIG. 11 is a flowchart of other embodiments of the present invention that can use link factories 810 and links to traverse a one-to-many or many-to-many EJB relationship. As shown in FIG. 11, upon EJB relationship traversal, a test is made at Block 1110 as to whether a collection registry has been created for this relationship role. If not, then at Block 1112, a collection registry is created by the link factory and at Block 1114 the collection registry is assigned to the relationship by the link factory. If a collection registry was created at Block 1110, then a test is made at Block 1120 as to whether a link has been assigned to manage this instance of the relationship. If not, then at Block 1122, the link is created by the link factory and at Block 1124, the link is assigned to manage the instance of the relationship.

Continuing with the description of FIG. 11, at Block 1130, if the relationship is materialized, i.e., the link has the target collection in hand, then at Block 1160, the link returns the target collection to the client. Otherwise, at Block 1140, the link checks the collection registry for the presence of its target. If present, then at Block 1150, the link references the collection and returns it. Otherwise, at Block 1142, the link materializes the related target entities and places them in a collection. At Block 1144, the link references the collection and returns it.

For entity passivation, for all links that have a reference to their target collection, the link registers the collection with its collection registry. Upon entity activation, no operations need be performed until a relationship is traversed at Block 1110.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of maintaining association integrity of Enterprise JavaBeans (EJBs) during EJB passivation and reactivation comprising:

obtaining a collection of target EJBs that are associated with a source EJB in a one-to-many or many-to-many association in response to traversing the one-to-many or many-to-many association of the source EJB;

registering the collection of target EJBs that are associated with a source EJB in a one-to-many or many-to-many association in a collection registry;

wherein the registering comprises registering the collection of target EJBs that are associate with a source EJB in a one-to-many or many-to-many association in the collection registry in response to passivation of the source;

reactivating the source EJB;

fetching the collection of target EJBs that are associated with the source EJB that is reactivated from the collection registry if the collection of target EJBs that are associated with the source EJB is registered in the collection registry; and materializing the collection of the target EJBs that are associated with the source EJB that is reactivated from secondary storage if the collection of target EJBs that are associated with the source EJB is not registered in the collection registry.

2. A method according to claim 1 further comprising:
reactivating the source EJB; and
fetching the collection of target EJBs that are associated with the source EJB that is reactivated from the collection registry in response to traversing the one-to-many or many-to-many association of the source EJB that is reactivated.

3. A method according to claim 2:
wherein the one-to-many or many-to-many association between the source EJB and the collection of EJBs is managed by a link factory;
wherein the registering comprises:
creating a collection registry by the link factory for the one-to-many or many-to-many association in response to traversing the one-to-many association or many-to-many association of the source EJB; and
creating a link object by the link factory to manage an instance of the one-to-many or many-to-many association; and
wherein the fetching comprises:
checking the collection registry by the link object;
returning the collection of EJBs if the link object finds the collection of EJBs in the collection registry; and
materializing the target collection if the target collection is not contained in the collection registry.

4. A method according to claim 3 wherein the materializing further comprises referencing the collection by the link object.

5. A method according to claim 3 wherein the fetching further comprises:
returning the target collection by the link object if the one-to-many or many-to-many association is materialized.

6. A method of maintaining association integrity of Enterprise JavaBeans (EJBs) during EJB passivation and reactivation comprising:
obtaining a collection of target EJBs that are associated with a source EJB in a one-to-many or many-to-many association in response to traversing the one-to-many or many-to-many association of the source EJB; and
registering the collection of target EJBs that are associated with a source EJB in a one-to-many or many-to-many association in a collection registry,
wherein the one-to-many or many-to-many association between the source EJB and the collection of target EJBs is managed by a link factory, and wherein the registering comprises:
creating the collection registry by the link factory in response to traversing the one-to-many or many-to-many association of the source EJB; and
registering the collection of target EJBs that are associated with the source EJB in the collection registry.

7. A system for maintaining association integrity of Enterprise JavaBeans (EJBs) during EJB passivation and reactivation comprising:
a computer usable storage medium;
a collection registry; and
a module that includes computer readable program code that is embodied in the computer usable storage medium, wherein the computer readable program code is configured to obtain a collection of target EJBs that are associated with a source EJB in a one-to-many or many-to-many association in response to traversing the one-to-many or many-to-many association of the source EJB, and to register the collection of target EJBs that are associated with a source EJB in a one-to-many or many-to-many association in the collection registry;
wherein the module is configured to register the collection of target EJBs that are associated with a source EJB in a one-to-many or many-to-many association in the collection registry in response to passivation of the source EJB;
wherein the module is further configured to fetch the collection of target EJBs that are associated with a source EJB that is reactivated from the collection registry if the collection of target EJBs that are associated with the source EJB is registered in the collection registry, and materialize the collection of target EJBs that are associated with the source EJB that is reactivated from secondary storage if the collection of target EJBs that are associated with the source EJB is not registered in the collection registry.

8. A system according to claim 7 wherein the module is further configured to fetch the collection of target EJBs that are associated with a source EJB that is reactivated from the collection registry in response to traversing the one-to-many or many-to-many association of the source EJB that is reactivated.

9. A system according to claim 7 further comprising:
a link factory that is configured to manage the one-to-many or many-to-many association between the source EJB and the collection of EJBs;
wherein the module is configured to register the collection of target EJBs by creating a collection registry by the link factory for the one-to-many or many-to-many association in response to traversing the one-to-many association or many-to-many association of the source EJB and creating a linked object by the link factory to manage an instance of the one-to-many or many-to-many association; and
wherein the module is configured to fetch the collection of target EJBs by checking the collection registry by the link object in response to the one-to-many or many-to-many association not being materialized, returning the collection of EJBs if the link object finds the collection of EJBs in the collection registry and materializing the target collection if the target collection is not contained in the collection registry.

10. A computer program product for maintaining association integrity of Enterprise JavaBeans (EJBs) during EJB passivation and reactivation, the computer program product comprising a computer usable storage medium having computer-readable program code embodied in the medium, the computer-readable program code comprising:
computer-readable program code that is configured to obtain a collection of target EJBs that are associated with a source EJB in a one-to-many or many-to-many association in response to traversing the one-to-many or many-to-many association of the source EJB; and
computer-readable program code that is configured to register the collection of target EJBs that are associated with a source EJB in a one-to-many or many-to-many association in a collection registry;
computer-readable program code that is configured to fetch the collection of target EJBs that are associated with a source EJB that is reactivated from the collection registry if the collection of target EJBs that are associated with the source EJB is registered in the collection registry;
computer-readable program code that is configured to materialize the collection of target EJBs that are associated with the source EJB that is reactivated from secondary storage if the collection of target EJBs that are associated with the source EJB is not registered in the collection registry; and wherein the computer-readable program code that is configured to register comprises computer-readable program code that is configured to register the collection of target EJBs that are associated with a source EJB in a one-to-many or many-to-many association in the collection registry in response to passivation of the source EJB.

11. A computer program product according to claim 10 further comprising:

computer-readable program code that is configured to fetch the collection of target EJBs that are associated with a source EJB that is reactivated from the collection registry in response to traversing the one-to-many or many-to-many association of the source EJB that is reactivated.

12. A computer program product according to claim 11:

wherein the one-to-many or many-to-many association between the source EJB and the collection of EJBs is managed by a link factory;

wherein the computer-readable program code that is configured to register comprises:

computer-readable program code that is configured to create a collection registry by the link factory for the one-to-many or many-to-many association in response to traversing the one-to-many association or many-to-many association of the source EJB; and computer-readable program code that is configured to create a link object by the link factory to manage an instance of the one-to-many or many-to-many associations; and wherein the computer-readable program code that is configured to fetch comprises:

computer-readable program code that is configured to check the collection registry by the link object;

computer-readable program code that is configured to return the collection of EJBs if the link object finds the collection of EJBs in the collection registry; and computer-readable program code that is configured to materialize the target collection if the target collection is not contained in the collection registry.

* * * * *